US009070255B2

(12) United States Patent
Christensen

(10) Patent No.: US 9,070,255 B2
(45) Date of Patent: Jun. 30, 2015

(54) TOURNAMENT GAMING MACHINE

(75) Inventor: Erik Christensen, Las Vegas, NV (US)

(73) Assignee: Bally Gaming, Inc., Las Vegas, NV (US)

(*) Notice: Subject to any disclaimer, the term of this patent is extended or adjusted under 35 U.S.C. 154(b) by 1771 days.

(21) Appl. No.: 12/027,097

(22) Filed: Feb. 6, 2008

(65) Prior Publication Data

US 2009/0197665 A1 Aug. 6, 2009

(51) Int. Cl.
*G06F 17/00* (2006.01)
*G07F 17/32* (2006.01)

(52) U.S. Cl.
CPC ............ *G07F 17/3279* (2013.01); *G07F 17/32* (2013.01)

(58) Field of Classification Search
None
See application file for complete search history.

(56) References Cited

U.S. PATENT DOCUMENTS 7,393,280 B2 7/2008 Cannon
7,699,697 B2 * 4/2010 Darrah et al. .................... 463/16
7,841,938 B2 * 11/2010 Gatto et al. ...................... 463/25
2002/0183105 A1 12/2002 Cannon et al.
2003/0036430 A1 2/2003 Cannon
2003/0064805 A1 * 4/2003 Wells .............................. 463/39
2003/0119581 A1 6/2003 Cannon et al.
2004/0043815 A1 * 3/2004 Kaminkow ...................... 463/25
2005/0014554 A1 * 1/2005 Walker et al. .................... 463/20
2005/0101383 A1 * 5/2005 Wells .............................. 463/39
2005/0181860 A1 * 8/2005 Nguyen et al. ................... 463/20
2006/0258446 A1 11/2006 Nguyen et al.
2007/0026936 A1 2/2007 Gatto et al.
2007/0054729 A1 3/2007 Hornik et al.
2008/0004101 A1 * 1/2008 Hein et al. ....................... 463/20
2008/0020825 A1 * 1/2008 Cuddy et al. ..................... 463/25
2008/0139275 A1 * 6/2008 Goss ............................... 463/16
2010/0137052 A1 * 6/2010 Bennett ........................... 463/16
2010/0197385 A1 * 8/2010 Aoki et al. ....................... 463/27

* cited by examiner

*Primary Examiner* — Paul A D'Agostino
(74) *Attorney, Agent, or Firm* — Brooke W. Quist; Marvin A. Hein; Philip J. Anderson

(57) ABSTRACT

Various embodiments disclosed herein are directed to methods, gaming machines, and gaming systems capable of simultaneously presenting two independent games for play. According to one embodiment, the gaming machine includes a cabinet for housing a display that simultaneously presents a first game that is independent from a second game. The first and second games are primary games, and a trigger event in either the first game or the second game initiates play of a tournament game. The gaming machine also includes a first set of player input devices for the first game and a second set of player input devices for the second game. The gaming machine also includes a player input device that allows a player to play both the first and second game simultaneously.

28 Claims, 11 Drawing Sheets

TOURNAMENT GAMING MACHINE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is related to co-pending U.S. patent application Ser. No. 12/027,119 concurrently filed on Feb. 6, 2008, entitled TOURNAMENT GAMING MACHINE AND METHODS.

BACKGROUND

Games of chance and gaming machines have been developed that have various features designed to capture and maintain player interest. Traditionally, games garner player interest by providing the player with the opportunity to win cash awards based upon a player's wager. For example, games may include one or more bonus games or the opportunity to win progressive jackpots in order to maintain player interest.

Additionally, over the years, games have grown in both sophistication and in the types of gaming features used to maintain a player's interest. For example, the mechanical reels of traditional gaming machines have been replaced with video depictions of spinning reels. These video gaming machines may provide a richer gaming experience for players by including graphics or animation as part of the game. However, there is a continuing need for games that provide player excitement and diversity of game play without creating overly complex games that unacceptably diminish player comfort.

SUMMARY

Briefly, and in general terms, various embodiments are directed to a gaming machine capable of simultaneously presenting two independent games for play. According to one embodiment, the gaming machine includes a cabinet for housing a main display that simultaneously presents a first primary game that is independent from a second primary game. A trigger event occurring during play of either the first game or the second game initiates play of a tournament game on the main display. The tournament game has a head-to-head tournament mode and a single player tournament mode. The gaming machine also includes a first set of player input devices for the first game and a second set of player input devices for the second game so multiple players can simultaneously play on the gaming machine. The gaming machine also includes a player input device that allows a single player to play both the first and second games simultaneously.

In another embodiment, the gaming machine includes a first primary game that is independent from a second primary game. The first and second games are presented side-by side on the gaming machine, and a trigger event occurring in the first or second game initiates play of a tournament game having a head-to-head tournament mode and a single player tournament mode. The gaming machine also includes a first set of player input devices for the first game and a second set of player input devices for the second game so multiple players can simultaneously play on the gaming machine. The gaming machine may include a player input device that allows a single player to play both the first and second games simultaneously.

In yet another embodiment, the gaming machine includes a widescreen display for simultaneously presenting a first primary game that is independent from a second primary game. A trigger event in either the first game or the second game initiates play of a tournament game. The first and second games are reconfigured to be played in a head-to-head tournament mode or a single player tournament mode. The gaming machine includes a first set of player input devices for the first game and a second set of player input devices for the second game so multiple players can simultaneously play on the gaming machine. The gaming machine also includes a player input device that allows a single player to play both the first and second games simultaneously. The gaming machine also includes two player card slots that are in communication with a player tracking system. The gaming machine includes one or more cashless gaming slots positioned within the cabinet of the gaming machine.

In addition to gaming machines, various embodiments of a gaming system are disclosed herein. According to one embodiment, the gaming system includes a plurality of networked gaming machines that are capable of simultaneously presenting a first game that is independent from a second game. A trigger event in either the first game or the second game triggers play of a tournament game mode. In the tournament game mode, the first and second games are reconfigured to be played in a head-to-head tournament or a single player tournament. The gaming system also includes a network server in communication with the plurality of networked gaming machines.

In another embodiment, the gaming system includes a plurality of networked gaming machines that are capable of simultaneously presenting a first game that is independent from a second game. A trigger event in either the first game or the second game initiates play of a tournament on all active networked gaming machines. The gaming system also includes a network server that manages the tournament or bonus game and is communication with the plurality of networked gaming machines. The gaming system also includes a player tracking system in communication with the network server. The player tracking system includes a database of player accounts.

In addition to gaming machine and gaming systems, various methods for presenting a game are disclosed herein. According to one method, player credits are received on a gaming machine. The gaming machine simultaneously presents a first game that is independent from a second game on a main display of the gaming machine. The first and second games are playable simultaneously by one or two players. After a player places a wager, the gaming machine initiates a player-selected game. The gaming machine then determines whether a triggering event has been established. If a triggering event has been established, a tournament game is initiated on either or both the first game and the second game. The tournament game has a head-to-head tournament mode for two players and a single player tournament mode for a single player. The gaming machine awards a prize to a winner of the tournament game.

According to another method, player credits are received on a gaming machine. The gaming machine presents a first game that is independent from a second game on a main display of the gaming machine. The first and second games are simultaneously initiated in response to a maximum wager. The gaming machine then determines whether a triggering event has been established in the first or second games. If a triggering event has been established, a tournament or bonus game is initiated on both the first and second games. The gaming machine awards a prize to a winner of the tournament game.

According to yet another method, a gaming machine receives player credits. The gaming machine presents a first game that is independent from a second game on a main display of the gaming machine. The first and second games are initiated in response to player input from a first player and a second player, respectively. The gaming machine then determines whether a triggering event has been established in either the first game or the second game. If a triggering event has been established, a tournament or bonus game is initiated on either or both the first game and the second game. The gaming machine awards a prize to a winner of the tournament game.

Other features and advantages will become apparent from the following detailed description, taken in conjunction with the accompanying drawings, which illustrate by way of example, the features of the various embodiments.

DETAILED DESCRIPTION

Various embodiments disclosed herein are directed to a gaming machine capable of simultaneously presenting two independent games for play. The gaming machine allows a single player to play one or both games (sequentially or simultaneously) or two players to play each game (sequentially or simultaneously). In one embodiment, a bonus game is initiated in response to a trigger event occurring in either one or both of the games. According to one embodiment, the bonus game may be a tournament game wherein each player competes against the other player for a prize.

The gaming machine disclosed herein effectively increases the size of the gaming establishment. Specifically, the gaming machine allowing two games to be simultaneous played in a given space on the gaming floor whereas a traditional gaming machine only allows for play of a single game in the same space. As a result, the disclosed gaming machine may potentially increase the revenue of a gaming establishment as more games may be played in a given area of the gaming establishment.

Figure 1:
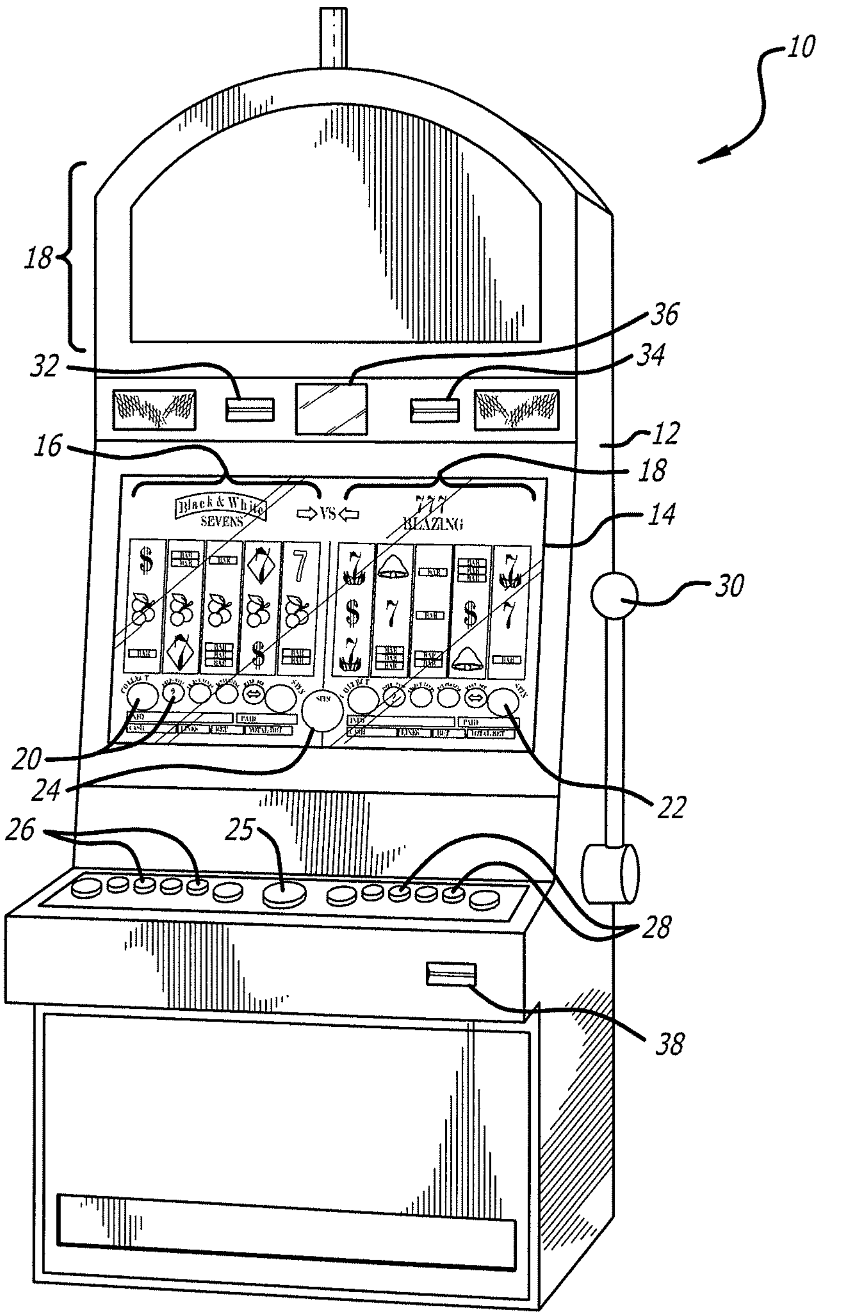
FIG. 1 is a perspective view of one embodiment of a gaming machine capable of simultaneously presenting two independent games for play.

Referring now to the drawings, wherein like reference numerals denote like or corresponding parts throughout the drawings and, more particularly to FIGS. 1-5, there are shown various embodiments of a gaming machine presenting two independent and distinct games. More specifically, as shown in FIG. 1, the gaming machine 10 includes a gaming cabinet 12 that houses a widescreen display 14. As shown in FIG. 1, the widescreen display 14 presents two independent and distinct five-reel slot games 16, 18. The slot games 16, 18 are from the same genre (i.e., slots games), but the games have different themes as the first game is a “Black and White 7s” game and the second game is a “Blazing 7s” game. In one embodiment, the games 16, 18 have identical game characteristics such as, but not limited to, wager denomination, maximum number of playable lines, bonus features, and payout structure for winning outcomes. Alternatively, the two games 16, 18 may have one or more different game characteristics. For example, a first game is a quarter denomination game having nine paylines and a second game is a dollar game having five paylines.

In another embodiment, the two games (not shown) presented on the display 14 are different genre of games. For example, the first game may be a slots game and the second game is a poker game. As those skilled in the art will appreciate, the two game presented to the player may be any combination of the following games: video slots, mechanical slots, video keno, video poker, video blackjack, video roulette, Class II bingo, games of skill, or games of chance involving some player skill. For the sake of brevity and clarity, the following disclosure and examples of the games are both slots-type games, but those skilled in the art will appreciate that any of the above-referenced games may be presented in the gaming machine 10.

In the disclosed embodiments, a bonus game is initiated in response to a trigger event (e.g., a special indicia appearing on a payline). The bonus game may be a tournament game, second-chance game (i.e., replay of the primary game or portion of the primary game to improve a game outcome), or a secondary game (i.e., another game of chance). For example, the secondary game is a wheel game similar to MONTE CARLO manufactured by Bally Gaming, Inc.

As shown in FIG. 1, the gaming cabinet 12 houses a single widescreen display 14 that presents two independent games side-by-side. In one embodiment, the gaming cabinet 12 is a cinema-style gaming cabinet (not shown) having a widescreen display 14, as disclosed in U.S. application Ser. No. 11/225,827, entitled “Ergonomic Gaming Cabinet,” filed on Sep. 12, 2005, which is hereby incorporated herein by reference.

Figure 4:
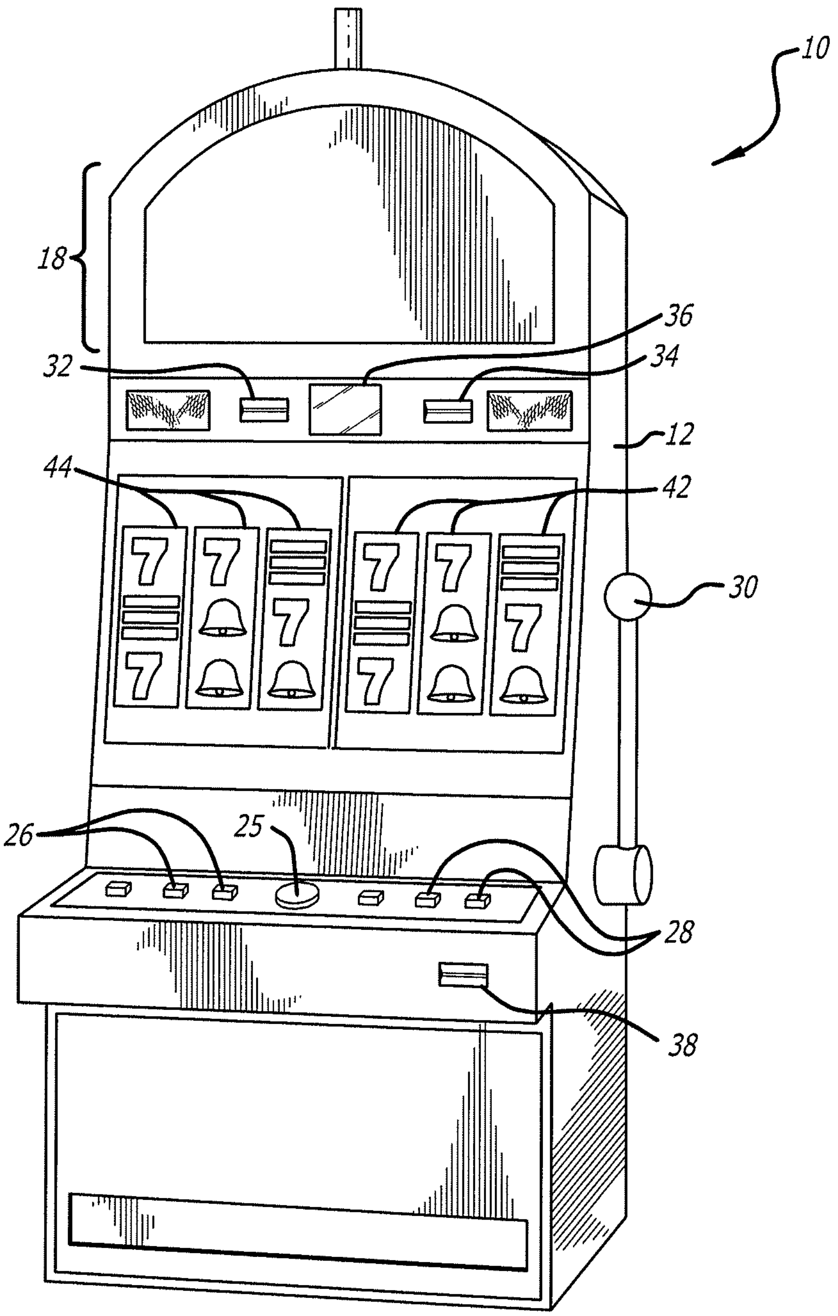
FIG. 4 is a perspective view of another embodiment of a gaming machine capable of simultaneously presenting two independent games for play.

Alternatively, the widescreen display 14 is positioned within the game cabinet 12 in a portrait orientation (not shown) and the games are played top-to-bottom. In the embodiment shown in FIG. 2, the gaming cabinet 12 houses two displays 40, 42 that each present a separate and distinct game. In the embodiment shown in FIG. 3, the gaming cabinet 12 houses a plurality of mechanical reels 42 and video display 40 adjacent to the reels. The plurality of mechanical reels 42 from a first game and the video display presents a second game that is independent from the first game. FIG. 4 illustrates another embodiment of a gaming machine having two separate and independent mechanical reels games 44, 46.

Figure 5:
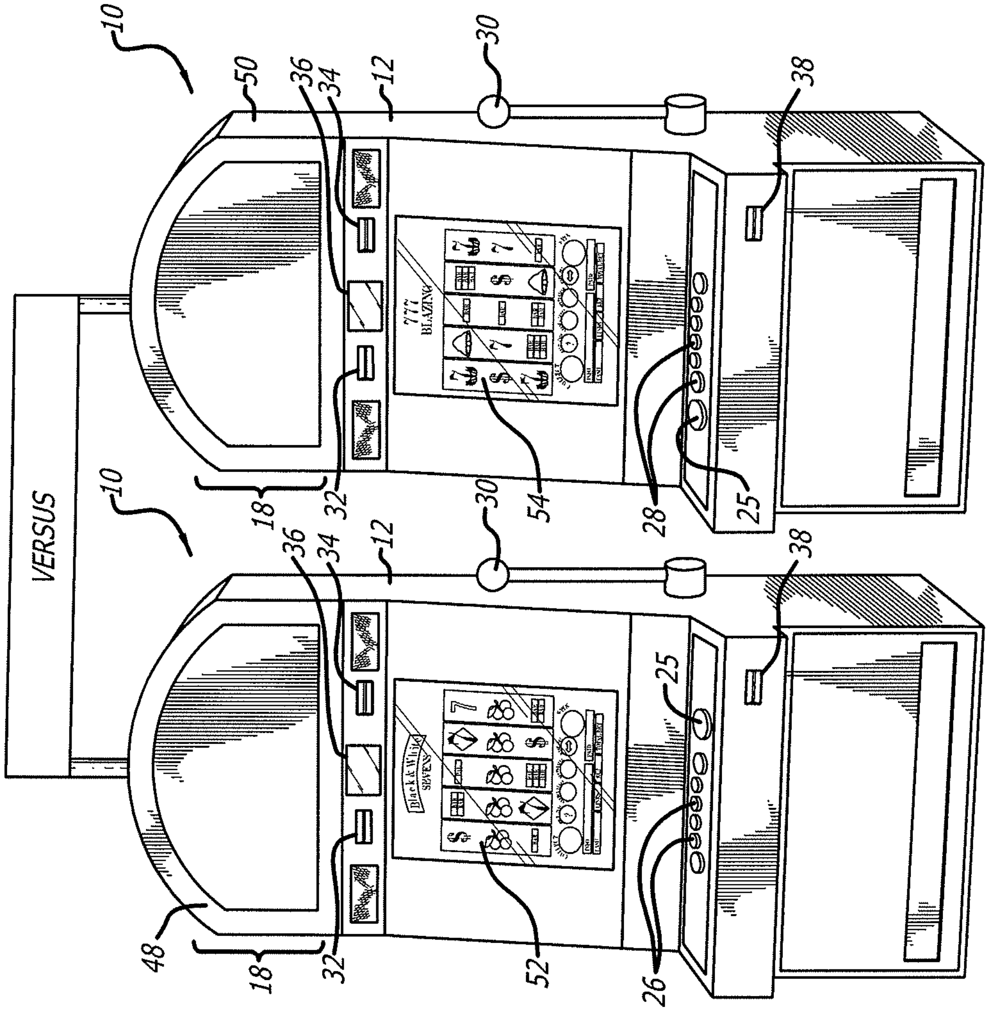
FIG. 5 is a perspective view of one other embodiment of a gaming machine capable of simultaneously presenting two independent games for play.

FIG. 5 illustrates yet another embodiment of two separate gaming cabinets each presenting an independent and distinct game that are linked together.

Figure 2:
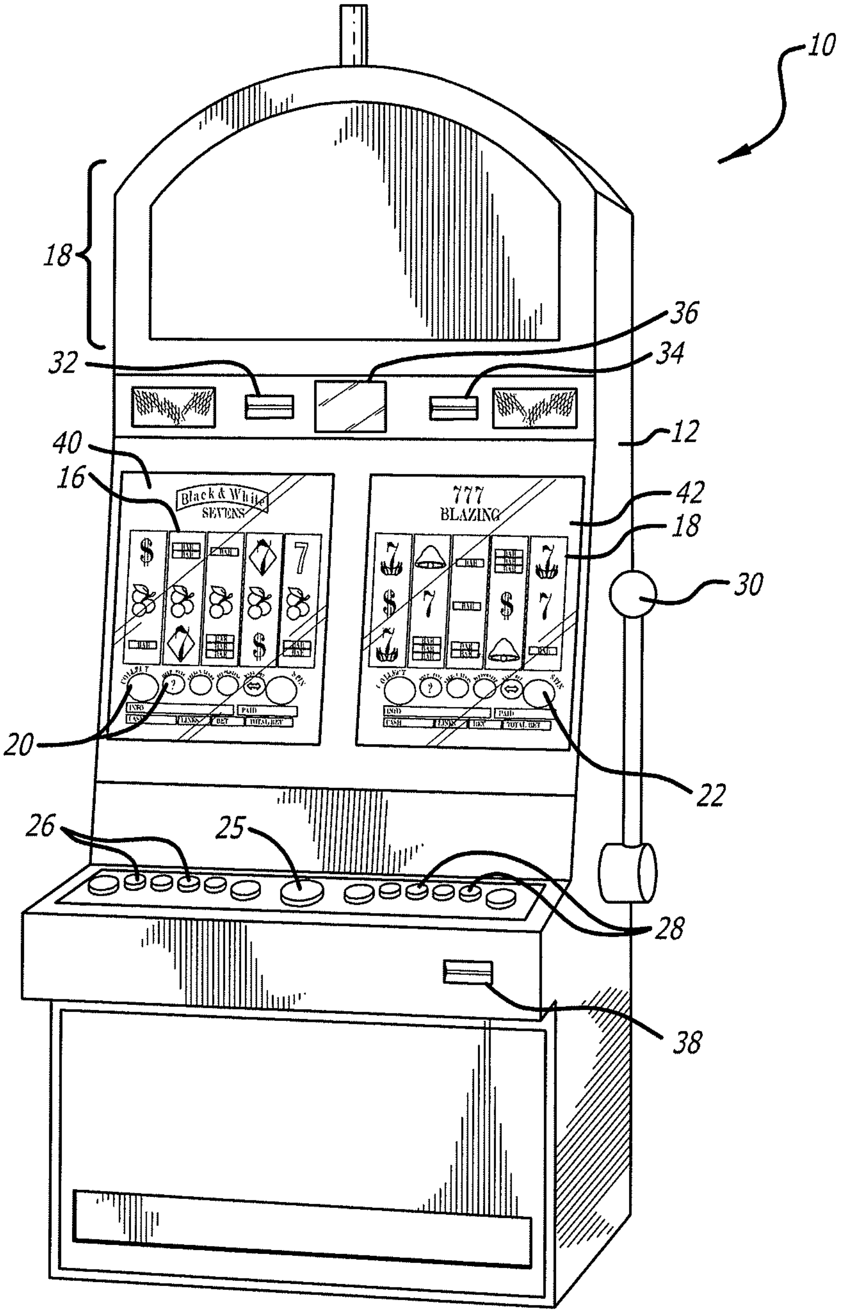
FIG. 2 is a perspective view of another embodiment of a gaming machine capable of simultaneously presenting two independent games for play.
Figure 3:
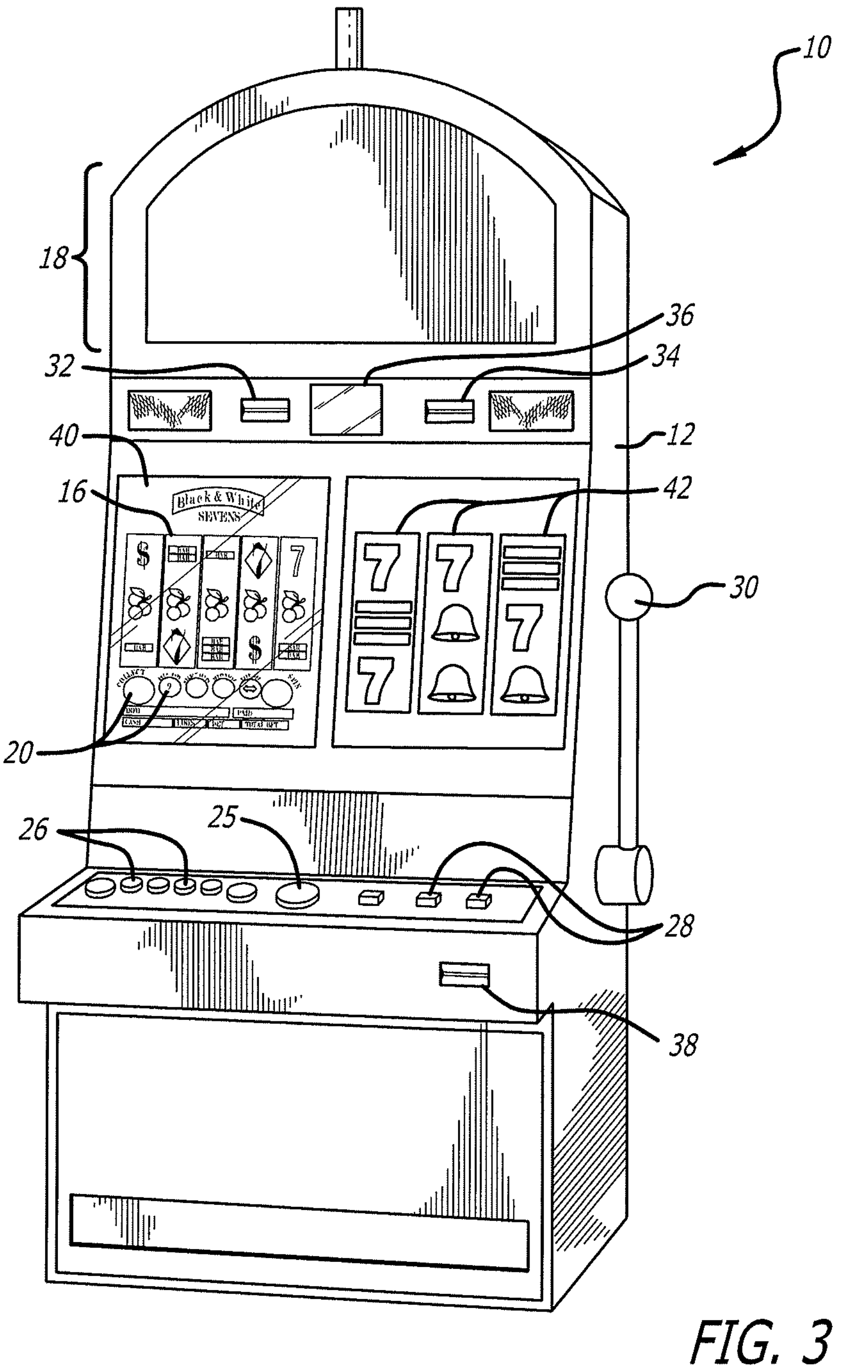
FIG. 3 is a perspective view of yet another embodiment of a gaming machine capable of simultaneously presenting two independent games for play.

In various embodiments having one or more display screens, the widescreen display 14 of FIG. 1 and the displays 40, 42 of FIG. 2 are flat panel displays including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing). In other embodiments, the displays 14, 40, and 42 are cathode ray tube monitors or projection monitors.

Optionally, the displays 14, 40, and 42 include a touch screen system (not shown) on the displays as shown in FIGS. 1-5. Each game 16, 18 includes a dedicated set of buttons 20, 42 having functions such as, but not limited to, a collect button, select lines button, bet per line button, max bet button, and a spin button. A max bet button 24 is also placed between the player interfaces in the embodiment shown in FIG. 1. The max bet button 24 allows the player to place a maximum wager, thereby allowing the player to play both games simultaneously.

The gaming machine of FIG. 1 also includes a player interface having a first set and a second set of buttons 26, 28 for each game presented on the display 14. The buttons 26, 28 function as input mechanisms and may include mechanical buttons, electromechanical buttons, touch screen buttons. While FIG. 1 illustrates a gaming machine having both a touch screen buttons and mechanical buttons, other contemplated embodiments have only mechanical buttons or touch screen buttons. According to one embodiment, the buttons 26, 28 are backlit to indicate whether the button is active. In another embodiment, one input mechanism is a universal button module that provides a dynamic button system adaptable for use with various games, as disclosed in U.S. application Ser. No. 11/106,212, entitled "Universal Button Module", filed Apr. 14, 2005 and U.S. application Ser. No. 11/223,364, entitled "Universal Button Module", filed Sep. 9, 2005, which are both hereby incorporated herein by reference. Additionally, other input devices, such as but not limited to, touch pad, track ball, mouse, switches, toggle switches, are included with the gaming machine to also accept player input. Optionally, one or more handles 30 may be "pulled" by a player to initiate a slots-based game.

Figure 6A:
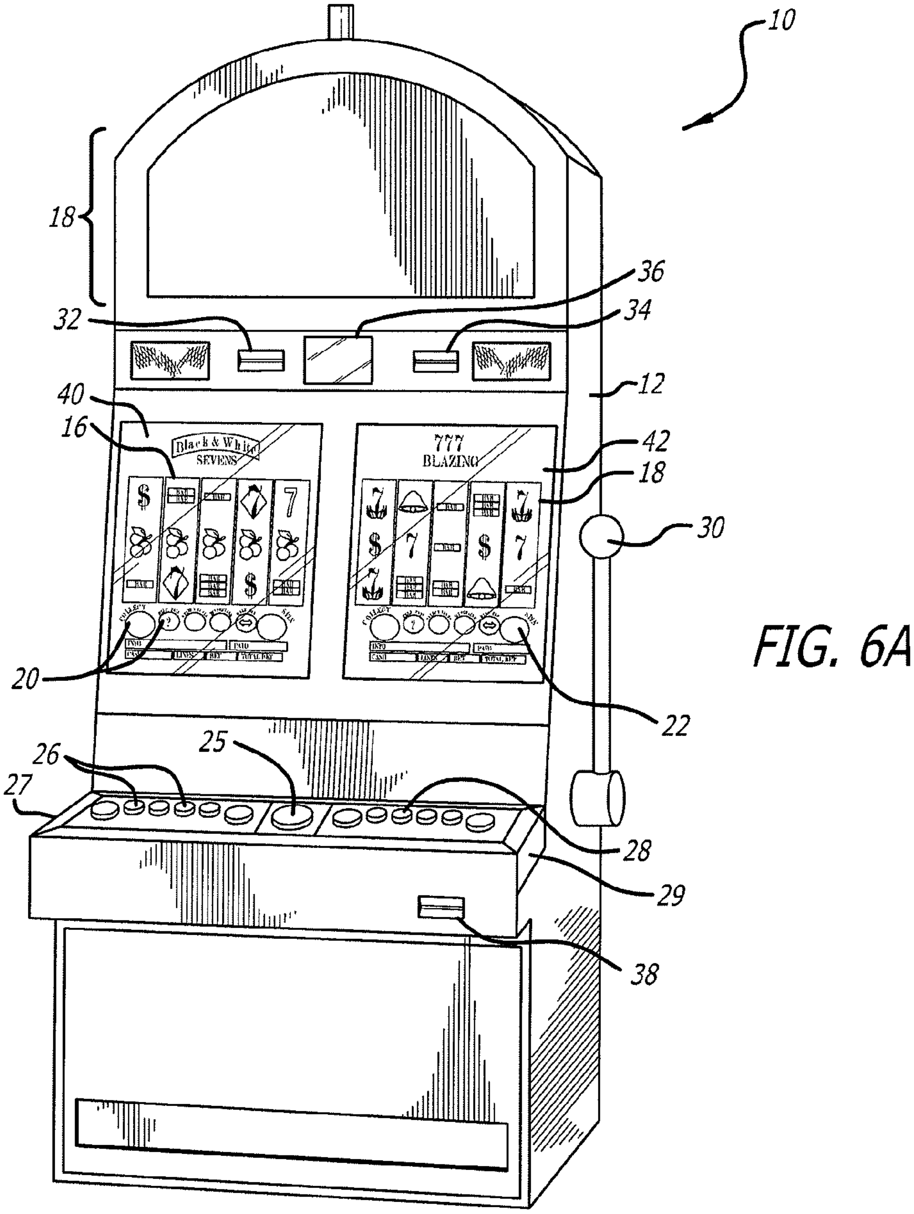
FIGS. 6A-6B are perspective views of one embodiment of a gaming machine having movable player interfaces.
Figure 6B:
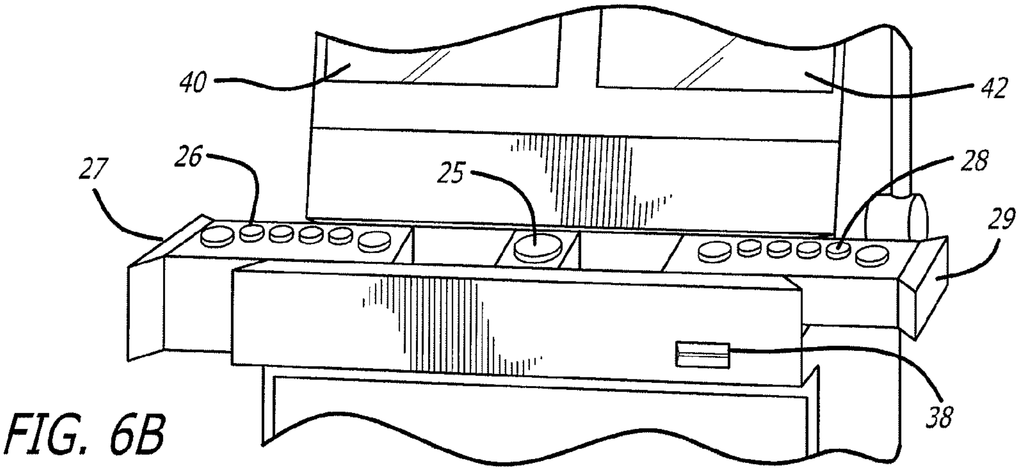

FIGS. 6A-6B illustrates an embodiment of a gaming machine having movable player interfaces 27, 29. A first set of buttons 26 are mounted on a first player interface 27, and the second set of buttons 28 are mounted on a second player interface 29. The player interfaces 27, 29 are movable platforms each having a set of buttons for play of the game, inputting player tracking information, configuring the gaming machine (e.g., swapping displays, adjusting font size on screen, or moving the player interface). As shown in FIG. 6A, the player interfaces 27, 29 are positioned in a default position whereby the outer edges of the player interfaces are flush with or set in from the sides of the gaming cabinet 12. FIG. 6B, illustrates the player interfaces 27, 29 in an expanded position so that the first and set of buttons 26, 28 are spaced further apart from one another (i.e., the player interfaces have moved away from the centerline of the gaming machine). The ability to separately move the player interfaces 27, 29 in opposite directions improves the ergonomics of the gaming machine. Additionally, because the player interfaces 27, 29 are moveable, smaller gaming cabinet may be used thereby minimizing the footprint of the gaming machine while maintaining the ability to present two independent game simultaneously to two players.

According to one embodiment, one or more tracks (not shown) are provided to allow the movement of the player interfaces 27, 29. The player interfaces are moveably mounted to a track. Accordingly, the player interfaces 27, 29 are able to move along the track to an extended position in response to player input via a button. That is, the players have the ability to adjust the position of player interfaces 27, 29. The player interfaces 27, 29 will return to the default position (i.e., position closest to the centreline of the gaming machine) after the gaming session has ended or in response to player input.

A motor (not shown) or other drive mechanism known or developed in the art is used in conjunction with a force transmission means to move the player interfaces 27, 29. As shown in FIGS. 6A-6B, the force transmission means includes a track or other guiding member that may be used to move the player interfaces in opposite directions along a horizontal direction. In one embodiment, a rack and pinion system is coupled to the motor to move the player interfaces. In other embodiments, the drive mechanism is coupled to a belt and pulley system, helical gears, bevel gears, work gears, four-bar linkage system, six-bar chain, extendable struts, or other mechanisms know or developed in the art.

In yet another embodiment, the gaming machine 10 includes one or more buttons 26, 28 that allows a player to swap the games 16, 18 presented on the display 14. As shown in FIG. 1, the "Black & White 7s" game 16 is shown on the left side of the display 14, and the "Blazing 7s" game 18 is shown on the right side of the display. The dedicated button allows the player to present the "Blazing 7s" game 18 on the left side of the display 14, and the "Black & White 7s" game 16 is shown on the left side of the display. The ability to swap the display of the games allows the players to configure the game according to their preferences.

In yet another embodiment, a cellular phone or other input device (e.g., PDA), separate and apart, from the gaming machine 10 may also be used to input various player choices and information to enhance the player's interactive experience with the gaming machine. In this embodiment, the gaming machine 10 also includes a IR sensor, RF sensor, BLUETOOTH receiver, or other means for receiving input from a cellular phone or other wireless input devices. Furthermore, inputting information via these devices provides an added level of security as any key presses may be hidden from view. In yet another embodiment, a player may call or send a text message or a short message service (SMS) to the gaming machine.

As shown in FIG. 1, the gaming machine 10 includes a ticket reader/ticket printer slot 38 that is associated with a cashless gaming system (not shown). According to one embodiment, the slot 38 is used for the ticket reader and ticket printer. Accordingly, the same slot 38 may be used to insert and/or issue a ticket. However, in alternate embodiments, separate slots (not shown) may be provided for the ticket acceptor and the ticket printer. In one embodiment, the ticket reader (not shown) of the cashless gaming system is capable of accepting previously printed vouchers, paper currency, promotional coupons, or the like. The ticket printer (not shown) of the cashless gaming system generates vouchers having printed information that includes, but is not limited to, the value of the voucher (i.e., cash-out amount) and a barcode that identifies the voucher. In the embodiment shown in FIG. 1, the slot 38 may generate tickets for both games. The tickets may include additional identifiers (e.g., name of the game) to distinguish the tickets for each player. Alternatively, the gaming machine (not shown) includes a separate ticket reader/ticket printer slot for each game.

Additionally, the gaming machine 10 is in communication with a player tracking system (not shown). The player tracking system allows a casino to monitor the gaming activities of various players. The player tracking system typically includes a database of all qualified players (i.e., those players who have enrolled in a player rating or point accruing program). Generally, the database for the player tracking system is separate from the gaming machines. Additionally, the player tracking system is able to store data relating to a player's gaming habits as well as the player's preferences for gaming machine configuration. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

The player tracking system is operatively connected to one or more input components on the gaming machine 10. These input components include, but are not limited to, a player card slots 32, 34 for receiving a player tracking card, a keypad or equivalent, and a display 36. As shown in FIG. 1, the gaming machine includes two player card slots 32, 34 for each independent game. Accordingly, the gaming activity of one or both players may be tracked. Alternatively, the gaming machine (not shown) only includes a single player tracking slot or no slot at all. If the gaming machine only has one player card slot (or if the gaming machine does not include a player card slot), the players may input player identification via a touch screen, keypad, or other input mechanisms that are associated with the player tracking system in lieu of inserting a player tracking card.

In another embodiment, the gaming machines 10 include an internet connection or other known network connections to link one or more gaming machines together. According to one embodiment, the internet connection is used for web browsing, prize redemption, or access to other gaming or non-gaming information. Additionally, with the various gaming machines in communication with one another (or a system host), the gaming machines 10 may participate in a gaming tournament. In one embodiment, the gaming tournament is a competitive gaming tournament having one or more winners. Alternatively, the gaming tournament is a cooperative gaming tournament where all eligible gaming machines win a particular award.

The main cabinet 12 of the gaming machine 10 also houses a CPU, circuitry, and software for receiving signals from the player-activated buttons 20 and one or more handles 30, operating the games, and transmitting signals to the game display and speakers. In one embodiment, the gaming machine uses one CPU (and related components) to operate both games 16, 18. Alternatively, each independent game 16, 18 on the gaming machine 10 has a dedicated processor (and related components) for operating each independent game. In another embodiment, each game 16, 18 and the bonus game are operated by separate processors that are in communication with one another. In yet another embodiment, the games 16, 18 are operated remotely via one or more servers.

According to one embodiment, each separate and independent game 16, 18 includes separate gaming meters. That is, each game 16, 18 is recognized by a casino management system as a separate and independent game. Although the games are presented in the same gaming machine, the games are independent from one another and the meter values are not combined for regulatory or player tracking purposes. Accordingly, gaming meter values related to coin in, wager amounts, wager frequency, award amounts, size of awards are independently tracked by the backend system by separate meters. However, in one embodiment, players may share the credits inputted or the winnings from either game, but each game still has its own set of gaming meters for tracking and regulatory purposes.

In various embodiments, one or more game programs may be stored in a memory (not shown) comprising a read only memory (ROM), volatile or non-volatile random access memory (RAM), a hard drive or flash memory device or any of several alternative types of single or multiple memory devices or structures. Optionally, the gaming machines 10 includes one or more data repositories for storing data. Examples of information stored by the gaming machines 10 include, but are not limited to, accounting data, maintenance history information, short and/or long-term play data, real-time play data, and sound data. In one embodiment, the data repository also stores display content configurations for various games and gaming machines.

In FIG. 1, the gaming machine 10 includes a top box 18 and a main cabinet 12. According to one embodiment, the top box 18 is a separate and distinct component that is affixed to the main cabinet 12. In another embodiment, the top box 18 is an area that is partitioned from the main cabinet 12. Alternatively, the top box 18 and the main cabinet 12 may be contiguous areas with the outward appearance of two distinct components. The top box 18 may include a secondary display for displaying game information (e.g., name of the game, animation, one or more pay tables, game information, one or more help menus, progressive jackpot or game information, tournament game information, or any combination thereof) or non-game related information (e.g., news, advertisements, messages, promotions, or any combination thereof). In one embodiment, the secondary display presents a secondary game such as, but not limited to, a bonus game, progressive game, or a continuation game of the primary game. In yet another embodiment, the top box 18 also includes a display glass that includes the name of the game, artwork, game instructions, pay table, or other information relating to one or more games presented on the gaming machine 10.

Figure 7A:
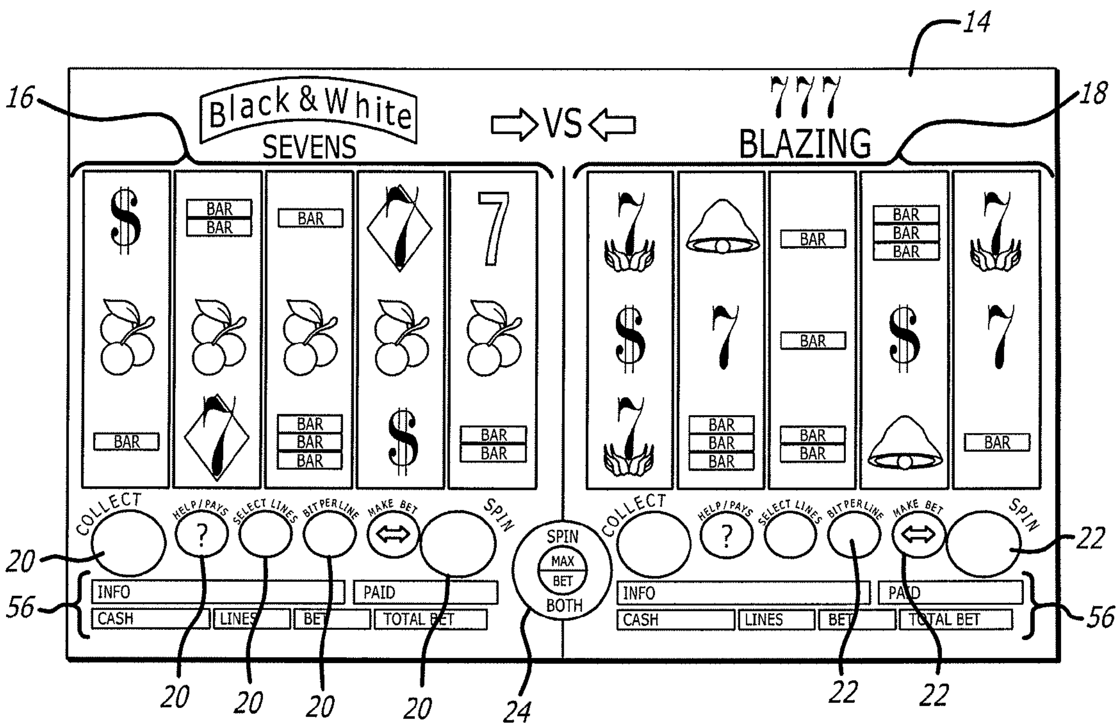
FIGS. 7A-7F are screenshots of one embodiment of a gaming machine capable of simultaneously presenting two independent games for play.

FIGS. 7A-7F illustrate screenshots of one embodiment of a gaming device presenting two independent games that are playable simultaneously by one or two players. FIG. 7A illustrates a screenshot of two independent five-reel games 16, 18. On the top of the screen is the title of the game (e.g., "Black and White 7s" and "Blazing 7s"). Optionally, as shown in FIG. 7A, each game has dedicated touchscreen buttons 20, 22 and dashboard display 56. The dashboard display 56 may present information such as, but not limited to, amount of paid for win, credits (cash) remaining, number of lines played, bet per line, total bet for a game, and an information field.

Figure 7B:
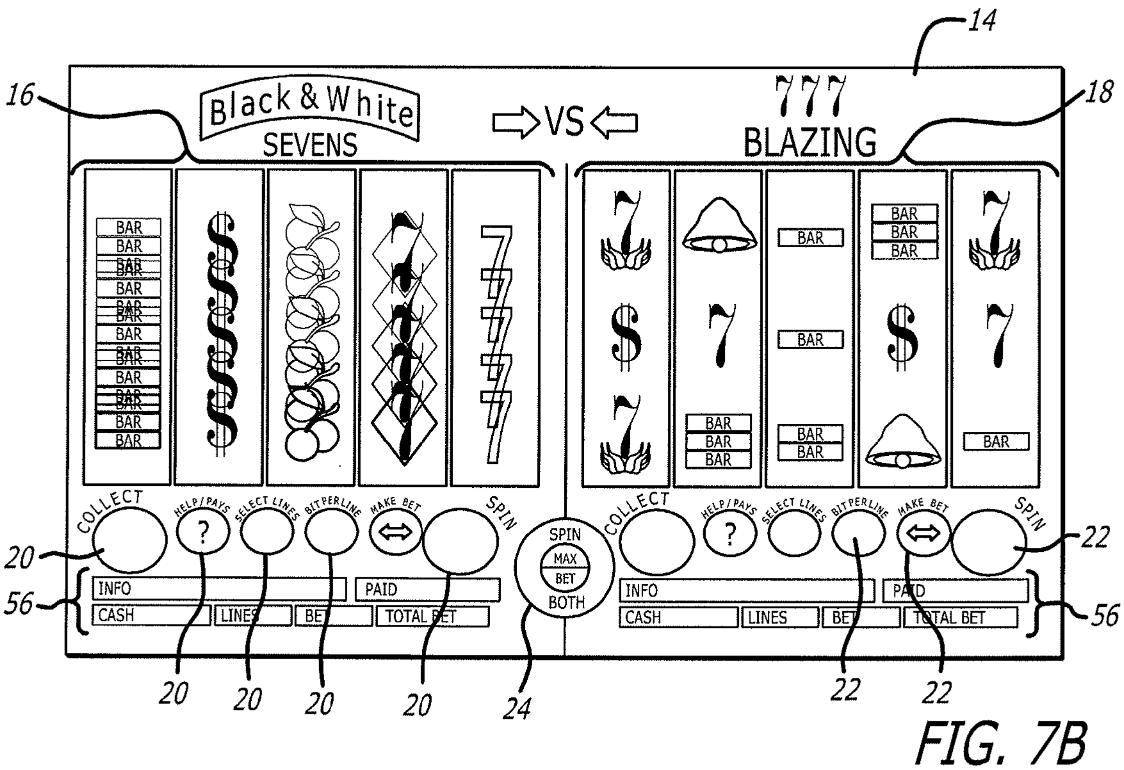
Figure 7C:
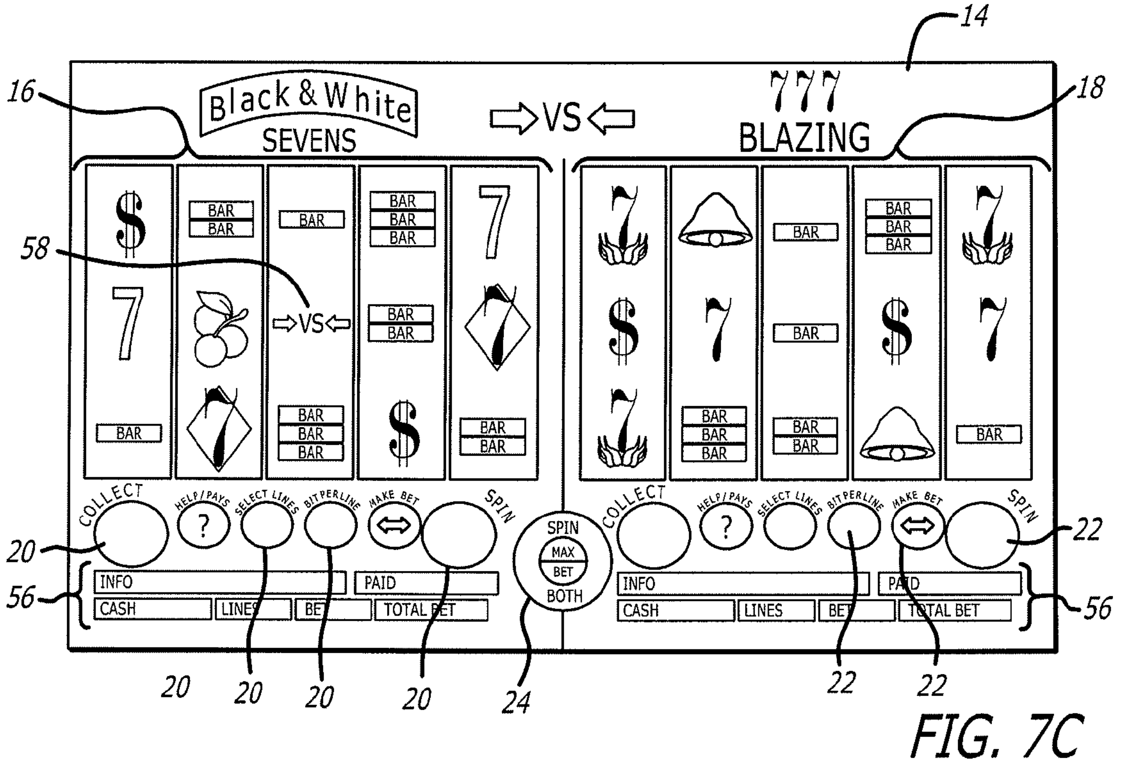
Figure 7D:
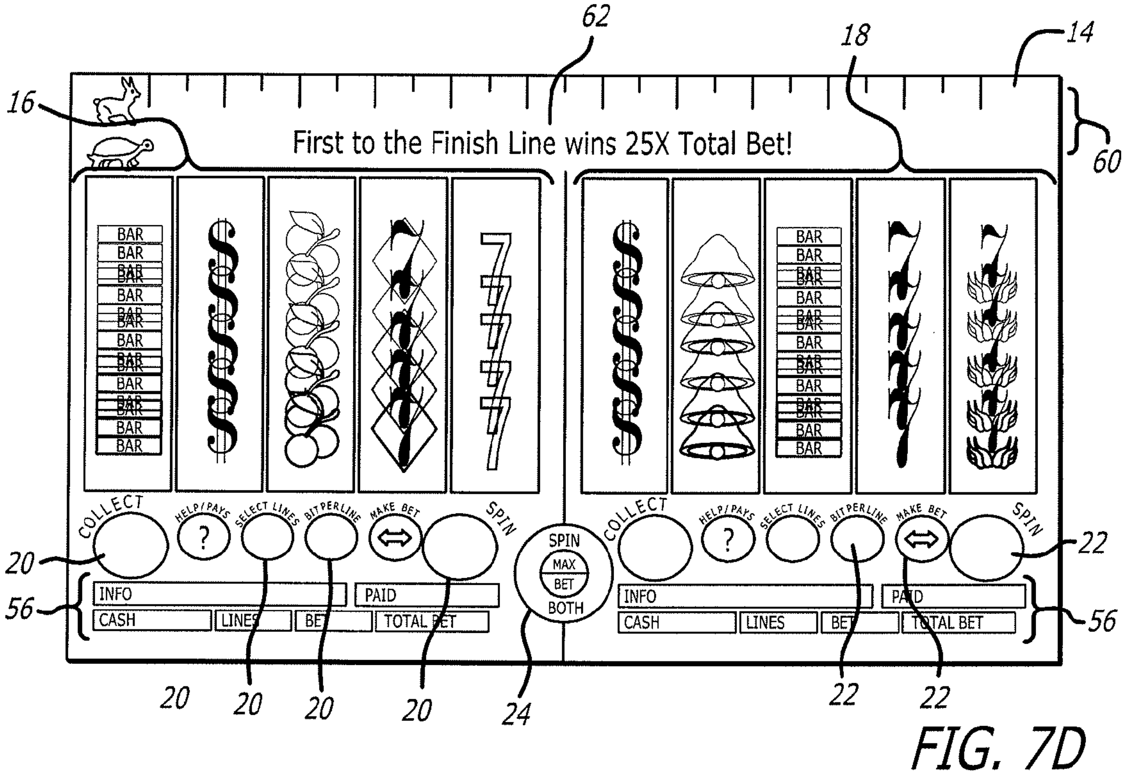

FIG. 7B illustrates a screenshot as the reels spin on a player selected game 16 while the game 18 on the right of the screen remains inactive. FIG. 7C illustrates an exemplary screenshot once the reels have come to a stop. FIG. 7C also shows one embodiment of a game indicia 58 (i.e., "VS" symbol) that triggers a tournament game. FIG. 7D is a screenshot of the start of the tournament game where the reels on both games begin to spin. In one embodiment, winning game outcomes during the tournament mode are awarded points and not credits. As shown in FIG. 7D, a status graphic 60 appears above the reels to display the progress of each player and their relative position to each other and the goal/finish of the game.

Each player is designated as a icon (e.g., rabbit or turtle). Additionally, a message 62 is also presented to the players notifying the players of the first place award (e.g., first to the finish line wins 25× total bet). In alternate embodiments, the display 14 may not include a status graphic. Rather, the status graphic 60 may be presented on a separate display (not shown) on the gaming machine. Optionally, the various embodiments, sound effects or audio may also be presented during the tournament game. For example, audio of announcer giving "play-by-play" of game progress and/or color commentary may also be presented during the tournament game.

Figure 7E:
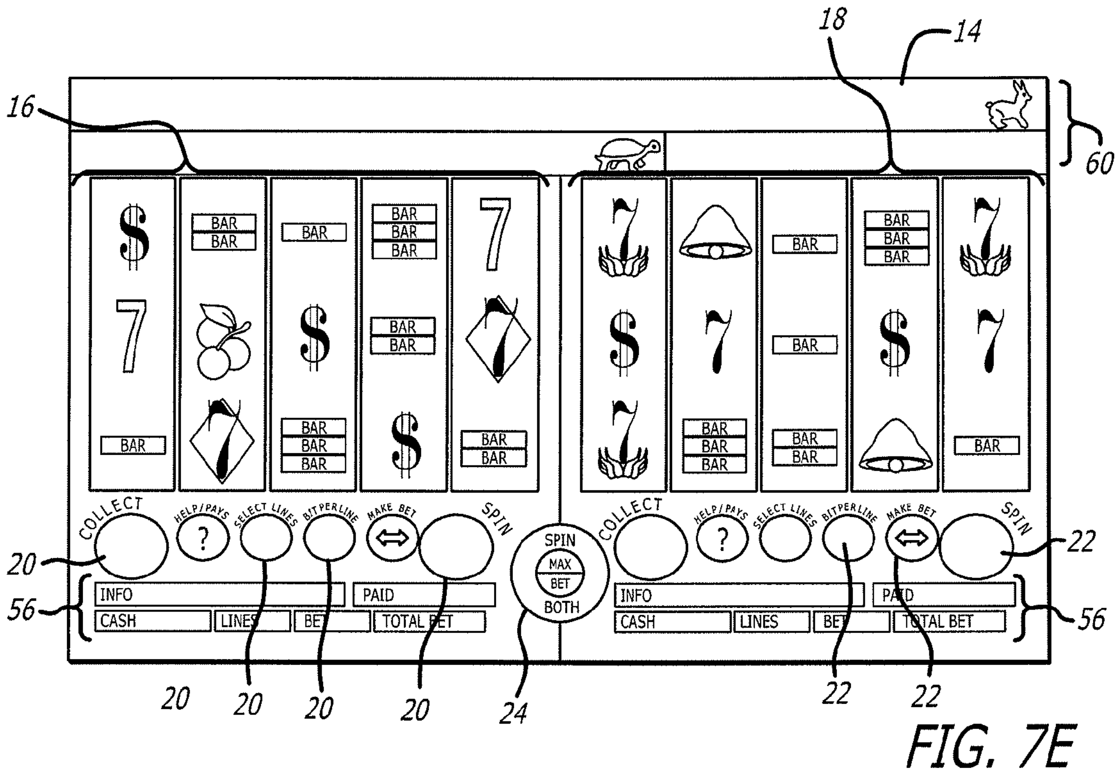
Figure 7F:
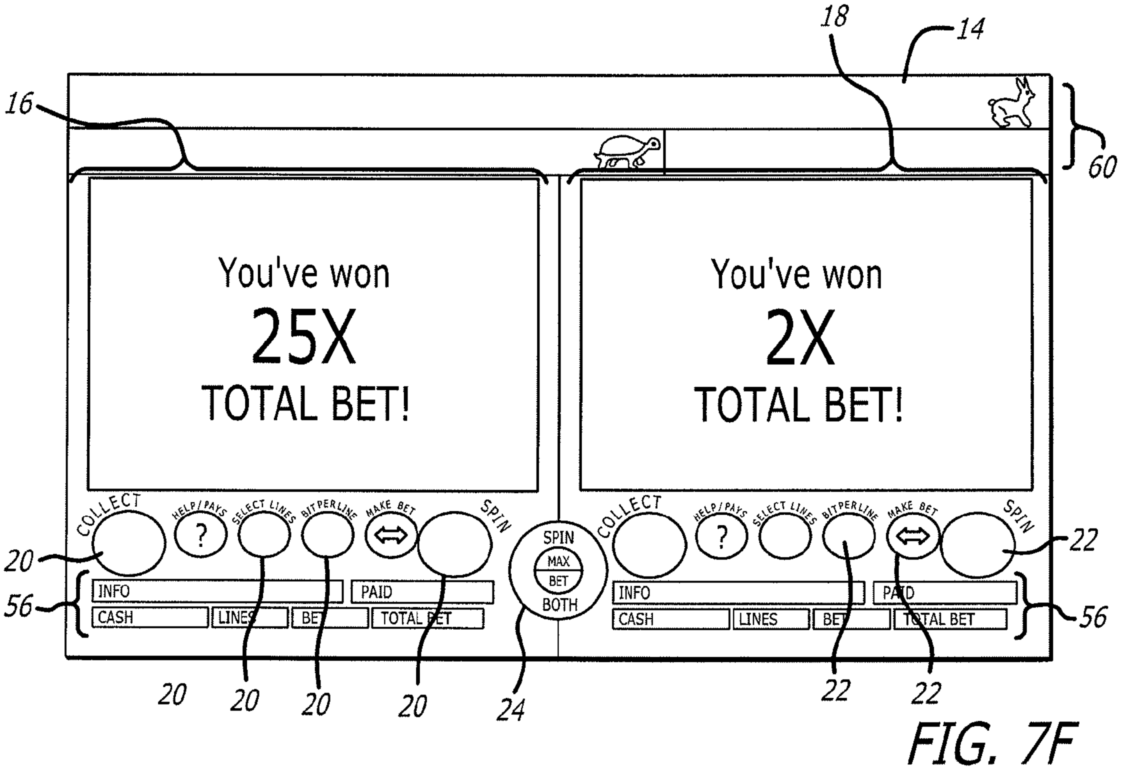

FIGS. 7E-7F are exemplary screenshots at the conclusion of the tournament game. In FIG. 7E, the status graphic 60 shows the player represented by the rabbit finishing prior to the player presented by the turtle. Additionally, the reels in both games 16, 18 have also stopped moving. In FIG. 7F, the award won for each player is shown on the respective portion of the game display 14 for each game 16, 18. After a predetermined period of time, the display 14 returns to the primary game format as shown in FIG. 7A.

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

Figure 8:
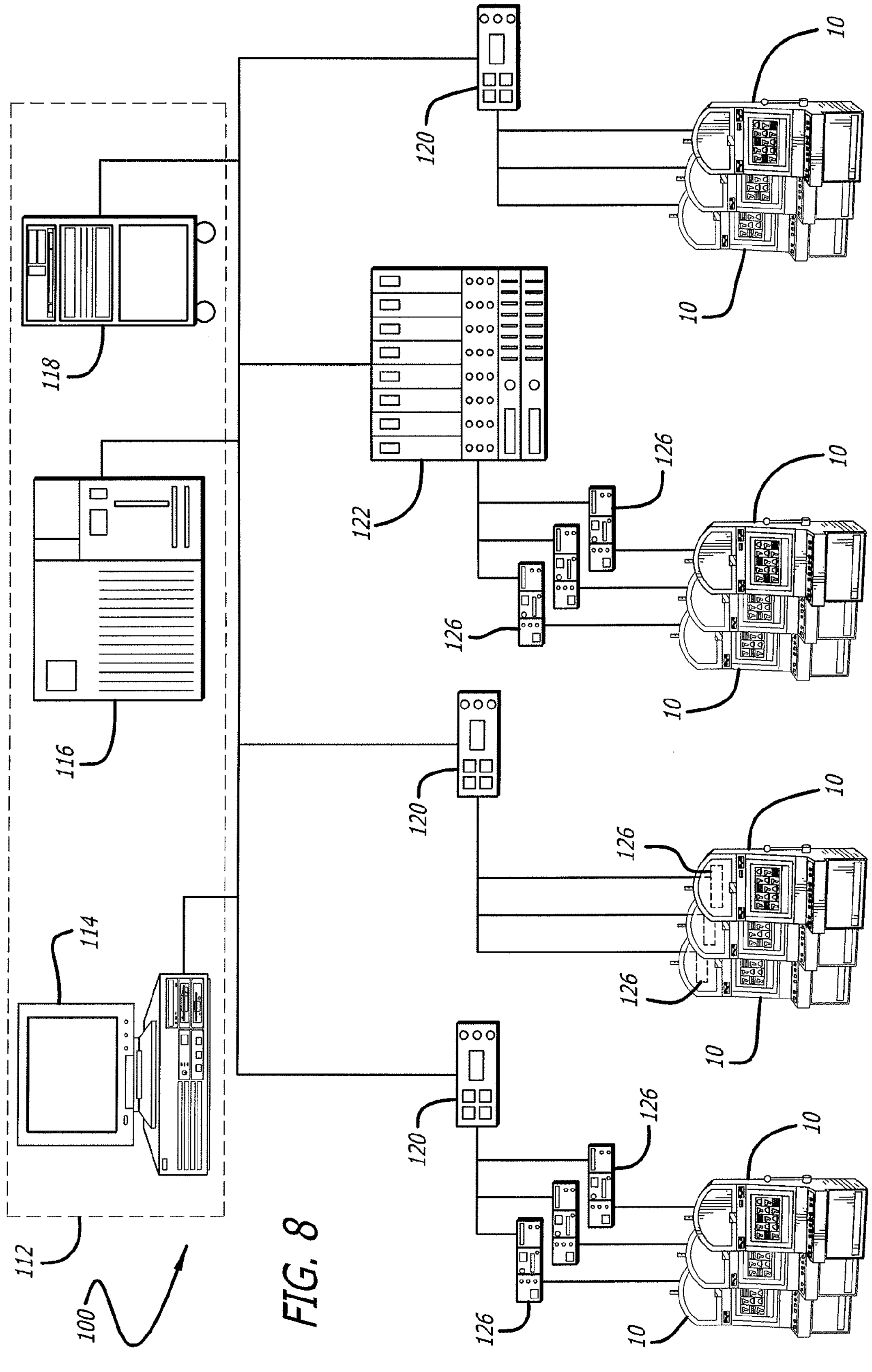
FIG. 8 is a diagram of one embodiment of a gaming system having a plurality of gaming machines capable of simultaneously presenting two independent games for play.

Referring now to FIG. 8, a casino gaming system 100 is illustrated. The casino gaming system 100 comprises one or more gaming machines 10. In various embodiments, any of the gaming machines 10 may be any type of electronic or mechanical gaming devices, such as, but not limited to, a mechanical reel spinning slot machine, video slot machine, video poker machine, keno machine, video blackjack machine, or a gaming machine offering one or more of the above-described games. Examples include, but are not limited to, the S6000 mechanical reel spinner and the Alpha video slot machine from Bally Gaming, Inc. The gaming machines 10, 20 illustrated in FIG. 8 act as terminals for interacting with a player playing a casino game. Networking components facilitate communications between the system server 112 and game management units 126 that control displays for carousels of gaming machines 10 across a network. Game management units (GMU's) 126 connect gaming machines to networking components and may be installed in the gaming machine cabinet or external to the gaming machine 10. The function of the GMU 126 is similar to the function of a network interface card connected to a desktop personal computer (PC). Some GMU's 126 have much greater capability and can perform such tasks as presenting and playing a game using a display (not shown) operatively connected to the GMU 126. In one embodiment, the GMU 126 is a separate component located outside the gaming machine 10. Alternatively, in another embodiment, the GMU 126 is located within the gaming machine 10. Optionally, in an alternative embodiment, one or more gaming machines 10 connect directly to a network and are not connected to a GMU 126.

The gaming machines 10 are connected via a network to a network bridge 120, which is used for networking, routing and polling gaming machines, including slot machines. The network bridge 120 connects to a back end system 112. Optionally, the gaming machines 10 may connect to the network via a network rack 122, which provides for a few number of connections to the back end system 112. Both network bridge 120 and network rack 122 may be classified as middleware, and facilitate communications between the back end system 112 and the game management units 126. The network bridges 120 and network rack 122 may comprise data repositories for storing network performance data. Such performance data may be based on network traffic and other network related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 112 may be configured to comprise one or more servers. The type of server employed is generally determined by the platform and software requirements of the gaming system. In one embodiment, as illustrated in FIG. 8, the back end system 112 is configured to include three servers: a slot floor controller 114, a casino management server 116 and a casino database 118. The slot floor controller 114 is a part of the player tracking system for gathering accounting, security and player specific information. The casino management server 116 and casino database 118 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end system 112 performs several functions. For example, the back end system 112 can collect data from the slot floor as communicated to it from other network components, and maintain the collected data in its database. The back end system 112 may use slot floor data to generate a report used in casino operation functions. Examples of such reports include, but are not limited to, accounting reports, security reports, and usage reports. The back end system 112 may also pass data to another server for other functions. Alternatively, the back end system 112 may pass data stored on its database to floor hardware for interaction with a game or game player. For example, data such as a game player's name or the amount of a ticket being redeemed at a game may be passed to the floor hardware. Additionally, the back end system 112 may comprise one or more data repositories for storing data. Examples of types of data stored in the system server data repositories include, but are not limited to, information relating to individual player play data, individual game accounting data, gaming machine accounting data, cashable ticket data, sound data, and optimal display configurations for one or more displays for one or more system game.

Of course, one will appreciate that a gaming system 100 may also comprise other types of components, and the above illustrations are meant only as examples and not as limitations to the types of components or games used in a casino gaming system having a displays capable of interchanging display content.

In addition to gaming machines and gaming systems, various methods for operating a gaming machine having two separate independent games that trigger a bonus game are disclosed herein. Generally, a single player selects one or both of the primary games for play. Alternatively, two players are able to play both primary games sequentially, simultaneously, or approximately simultaneously. If a trigger event occurs in either of the primary games, a bonus game is triggered. The bonus game may be a tournament game, a second-chance game, a single play (or limited play) bonus game, or a community game. At the end of the bonus game, the player or players may or may not win a prize.

Figure 9:
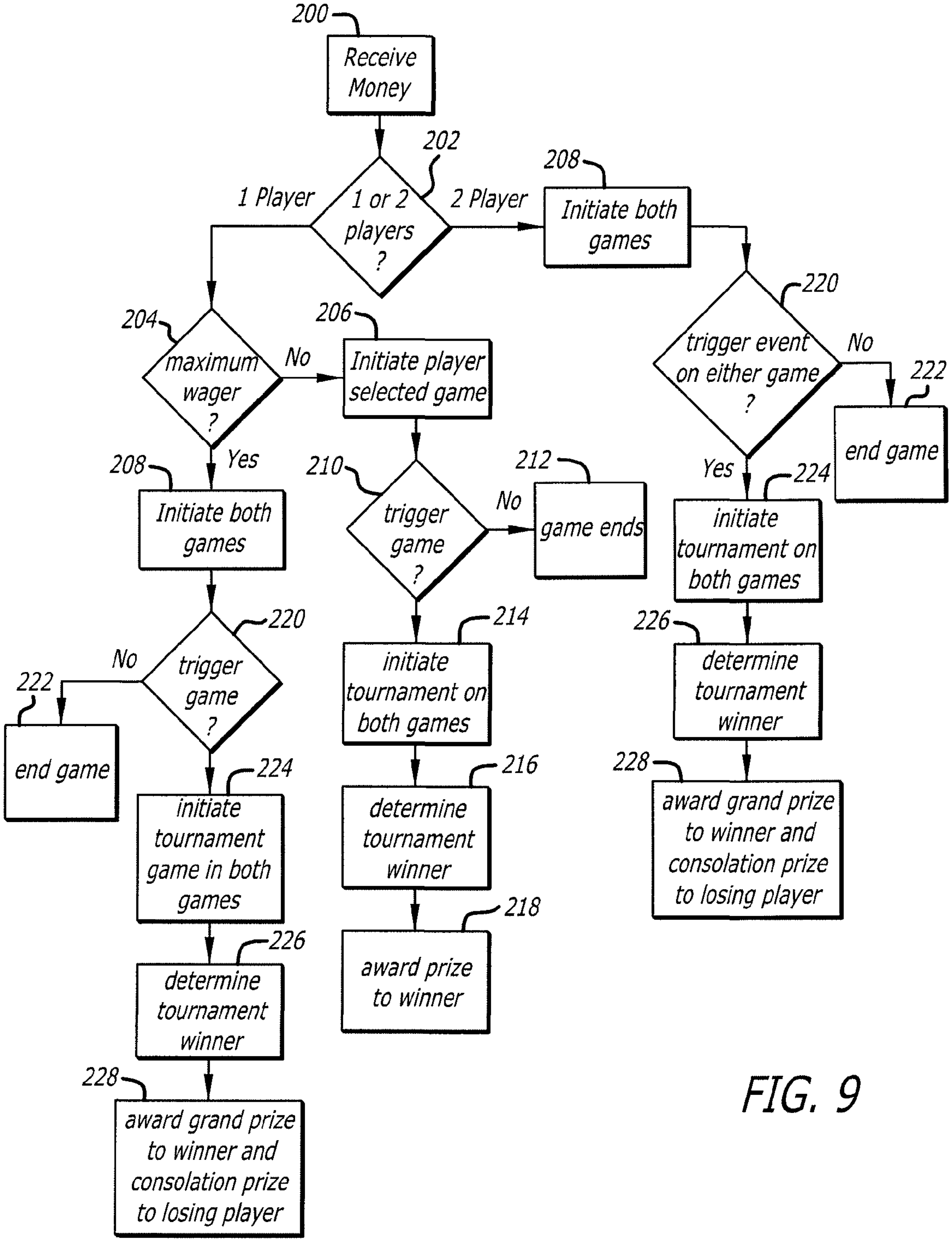
FIG. 9 is flow diagram of one method for simultaneously presenting two independent games on a gaming machine.

FIG. 9 illustrates one method of operating a gaming machine capable of simultaneously presenting two independent games for play. At step 200, the gaming machine receives credits from a player or players. The credits may be in the form of a cash, cashless voucher, promotional credits, electronic fund transfers, or any other form of credit. In one method, the gaming machine queries the player(s) if there is one or two players at step 202. Alternatively, the gaming machine does not query the player but rather receives player input that initiates game play for one or both games. If the gaming machine receives player input that only one player is playing the machine at step 202, the gaming machine determines whether there is sufficient credits for a maximum wager by the player at step 204. If the gaming machine determines that the player does not have enough credits for a maximum wager at step 204, the gaming machine does not activate the maximum wager button. If the gaming machine determines that the player has a sufficient number of credits at step 204, the gaming machine activates the maximum wager button. At this point, the gaming machine may activate one game or both games depending upon the player's input.

At step 206, the gaming machine initiates the player-selected game if a single player does not make a maximum wager. The selected game is based upon player input starting one of the games (e.g., pressing spin or deal button). Alternatively, the gaming machine initiates both games if the maximum wager button is actuated by the player at step 208. At step 210, the gaming machine determines whether a triggering event has been established. According to one embodiment, a triggering event is a particular indicia appearing on an active pay line. Alternatively, the triggering event is a particular game outcome, combination of game indicia, game score, or any other game outcome including both winning and losing game outcomes. For example, the triggering event may be a symbol combination of "cherry-cherry-cherry" for a slots-type game. In a poker game, the triggering event may be a pair of jacks or better. In other embodiments, the triggering event may be any winning outcome having a low or high probability.

Alternatively, the triggering event is a game-generated or system-generated response such as, but not limited to, a message from another networked gaming machine or a message from a system host. For example, the message is a tournament-initiating message (e.g., tournament is starting or player is eligible to play in the tournament) or a system-initiated bonus game message (e.g., bonus game is starting or player is eligible for the bonus game). The triggering events also may be based upon player activity/actions. For example, the triggering event may be based upon player performance such as, but not limited to, inserting a player tracking card into the gaming machine, time of play, frequency of play (i.e., number of games played in a particular period of time), number of maximum bets, number of player points earned, or a combination thereof.

If the gaming machine determines that a trigger event has not been established, the game ends at step 212. Alternatively, the gaming machine initiates a tournament game on both games at step 214 when a triggering event has been established. When a single player is playing only one primary game, the player plays one tournament game, and the gaming machine plays the tournament game in the inactive game. The player is able to control the rate of play for one game whereas the inactive rate of play for the game is controlled by the gaming machine. In various embodiments, the rate of play for the computer-controlled game is a pre-established rate (e.g., game is played once every five seconds, or a randomly selected rate prior to play (e.g., game is played every 3.2 seconds, or the rate of play is variable throughout the tournament (e.g., rate of play is a game every 5 seconds, then a game every 2 second, and then a game every 4 seconds). At the conclusion of the tournament game, the gaming machine determines whether the player or the gaming machine has won the tournament at step 216. Alternatively, the tournament game ends when a particular score or goal is achieved. At step 218, a prize is awarded to the winner (be it the player or the gaming machine). Accordingly, in one method, if the gaming machine wins the tournament, the player does not win a prize. In an alternate method, a consolation prize is awarded to losing party. Depending on the rules of the tournament game, the player may win nothing, a consolation prize, or the grand prize for the tournament based upon the player's result in the tournament game.

If a single player initiated play of both games at step 208, the gaming machine evaluates both game to determine if there is a triggering event at step 220. If a triggering event has not been established for either game, the games end at step 222. If a triggering event is established in either or both games, a tournament game is initiated at step 224. The rate of play for both games is controlled by the player. At the conclusion the tournament game, the gaming machine determines which player position has won the tournament at step 226. Alternatively, the tournament game ends when a particular score or goal is achieved. At step 228, a prize is awarded to the winning game since the player is playing both games. In one method, the player wins a grand prize and the consolation prize. In another embodiment, the player only wins a single prize (i.e., grand prize).

In another method, two players are able to play the two games on the gaming machine (sequentially or approximately simultaneously). If a trigger event occurs in either of the primary games at step 220, a bonus game is triggered for both the players at step 224. The bonus game may be a single play bonus game where each player gets to play the bonus game once. In another method, the bonus game is a second-chance game that allows the player the opportunity to play a portion of the primary game again in order to improve the primary game outcome (e.g., nudge or re-spin a reel in a slots-style game or re-draw a card in a poker game). In yet another method, the bonus game is a tournament game. The players compete with one another to earn as many points in a given period of time or be the first player to reach a particular goal. According to one method, the winning player gets a larger prize as compared to the losing player. For example, the winning player is issued a 25× multiplier, and the losing player wins a 2× multiplier as shown in FIG. 7F. Alternatively, only the winning player gets a prize.

The method having two players playing both games is operated in a similar manner to a single player playing both games. The two players are able to play their respective game independent of the other player's game (e.g., start and/or stop game play independent of other player). In one method, a trigger event in one player's game will trigger a tournament game between both players. In another method, a trigger event would need to occur in both games in order to trigger the tournament game. When the tournament game is triggered, the gaming machine is reconfigured to issue points for winning outcomes as opposed to credits. In either method, the two players would compete against one another during play of the tournament game. Accordingly, players with the most points at the end of the tournament game (or is first to reach a tournament goal) is the winner of the tournament.

In addition to various methods for operating a gaming machine having two separate independent games that trigger a bonus game, various characteristics of the game are customizable according to a player's preferences. These preferences may be saved onto a player tracking card or a player account that is stored on a back end system. The properties of the game that may be customized include the speed of game play, preferred wager denominations, preferred number of default paylines to play for a given spin, layout of the game display, font size on the display screen, or any combination thereof. Additionally, the game may be configured to the player according to player characteristics. For example, a player is awarded one or more bonus rounds on special dates (e.g., birthday, wedding anniversary, membership milestones (e.g., player club member for one year)) or during promotional periods or during one or more holidays, or being a member of a particular convention or tour group. In another embodiment, the paytable for the game is configured to a particular player club level (e.g., Silver, Gold, and Platinum paytables).

Additionally, the gaming machine may be configured to allow the player to choose the games presented on the gaming machine. In one embodiment, the player is able to select the game to be played from a list of games stored on the gaming machine. In another embodiment, the player selects a game, and the game is downloaded from the backend system. If the two players are playing different primary games (e.g., poker and blackjack), the gaming machine may revert back to the default game for the bonus game or tournament game (e.g., slots-style game). In another embodiment, the player-selected games are used to play the bonus game or tournament game.

Another property of the game that may be configured by the player is the management of gaming credits. In a default mode, each individual player only plays with their own money. Alternatively, the player(s) may elect to pool their respective credits together for play on the gaming machine. Accordingly, each player may play their respective games using the credits from the pooled credits from both players. The players may also define how many credits each player is entitled to use from the pool. For example, the player one may only be allowed to play $20 worth of credits whereas player two is limited to play $50 worth of credits.

Additionally, the players may be establish the rules regarding the apportioning of winning credits are apportioned. For example, in a default mode, any winning credits from either player is contributed to the pool. In another embodiment, the players may define that a percentage of any winning outcome is only contributed to the pool (e.g., 25% of a win). Accordingly, the gaming machine has meters to keep track of each individual player's credits as well as pooled credits. In yet another embodiment, a player may elect to transfer gaming credits to the other player on the gaming machine.

In yet another embodiment, the disclosed games are configured for community play. Community play is a plurality of players playing the game toward a common goal or in competition with one another. For example, players playing the games may collectively attempt to collect a sufficient number of play points to qualify for the bonus round. Alternatively, all the active players are awarded a bonus round when a single player achieves a sufficient number of play points. That is, a single player may trigger a bonus round for all the active players. In another embodiment, the players are all competing to achieve a particular trigger event for the bonus round (e.g., the fastest player to achieve a predetermined number of play points wins one or more bonus rounds). In yet another embodiment, the game is configured for tournament play. Accordingly, a single player on the gaming machine or two players on a single gaming machine plays the tournament game and competes with other players on similar gaming machines, and the player (or players) that achieves the highest score (or earns the most credits) is the winner of the tournament.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A device-enabled gaming system comprising:

a physical network that connects and enables communication between components in the gaming device-enabled gaming system;

a server connected to the physical network, the server including one or more processors; and a gaming machine configured to present a game, wherein the gaming machine is in communication with the server through the physical network, and wherein the game has a two-player mode in which two players each concurrently play individual, separate and distinct, primary games that enable activation of a first head-to-head tournament game played against each other, and wherein the game has a one-player mode in which one player concurrently plays both primary games that enable activation of a second head-to-head tournament game, the gaming machine comprising:

a cabinet housing a main display for simultaneously presenting a first primary game of the individual, separate and distinct, primary games that is independent from a second primary game of the individual, separate and distinct, primary games, wherein the first primary game and the second primary game do not share reels, and a trigger event in the first or second primary game initiates play of the first or second head-to-head tournament game on the same main display, wherein the two players swap corresponding primary games between each other before the initiation of the first or second head-to-head tournament game;

a first set of player input devices for the first primary game and a second set of player input devices for the second primary game; and a single player input device that allows a player to play the first and second primary games simultaneously.

2. The gaming machine of claim 1, further comprising two player card slots positioned on the cabinet, wherein two player card slots are in communication with a player tracking system.

3. The gaming machine of claim 1, further comprising a touchscreen system operably coupled to the display.

4. The gaming machine of claim 1, further comprising one or more cashless gaming slots positioned within the cabinet of the gaming machine.

5. The gaming machine of claim 1, wherein the display is a widescreen display.

6. The gaming machine of claim 1, wherein the trigger event is a randomly selected game outcome, a specialized bonus symbol, a predetermined number of maximum wagers, a predetermined number of paylines played, a player card level, time of play, frequency of play, or a combination thereof.

7. A device-enabled gaming system comprising:

a physical network that connects and enables communication between components in the gaming device-enabled gaming system;

a server connected to the physical network, the server including one or more processors; and a gaming machine configured to present a game, wherein the gaming machine is in communication with the server via the physical network, and wherein the game has a two-player mode in which two players each concurrently play individual, non-overlapping, primary games that enable activation of a first head-to-head tournament game played against each other, and wherein the game has a one-player mode in which one player plays one of the primary games that enables activation of a second head-to-head tournament game played against the gaming machine, the gaming machine comprising:

a first primary game of the individual, separate and distinct, primary games that is independent from a second primary game of the individual, separate and distinct, primary games, wherein the first and second primary games do not share reels and are presented side-by side, and wherein a trigger event occurring in the first or second primary game initiates play of the first and second head-to-head tournament game, wherein the two players swap corresponding primary games between each other before the initiation of the first or second head-to-head tournament game;

a first set of player input devices for the first primary game;

a second set of player input devices for the second primary game; and a single player input device that allows a player to play the first and second primary games simultaneously.

8. The gaming machine of claim 7, wherein the first primary game and the second primary game are presented on a widescreen display.

9. The gaming machine of claim 7, wherein the first primary game is presented on a first display and the second primary game is presented on a second display.

10. The gaming machine of claim 7, wherein the first primary game is presented on a video display and the second primary game is presented on a plurality of mechanical reels.

11. The gaming machine of claim 7, wherein the first primary game is presented on a first set of mechanical reels and the second primary game are presented on a second set of mechanical reels.

12. The gaming machine of claim 7, wherein the trigger event is a randomly selected game outcome, a specialized bonus symbol, a predetermined number of maximum wagers, a predetermined number of paylines played, a player card level, time of play, frequency of play, or a combination thereof.

13. The gaming machine of claim 7, wherein the player input device and the first and second set of player input devices are electro-mechanical buttons, mechanical buttons, touchscreen buttons, or any combination thereof.

14. The gaming machine of claim 7, further comprising two player card slots positioned on the cabinet, wherein two player card slots are in communication with a player tracking system.

15. The gaming machine of claim 7, further comprising one or more cashless gaming slots positioned within the cabinet of the gaming machine.

16. A device-enabled gaming system comprising:

a physical network that connects and enables communication between components in the gaming device-enabled gaming system;

a server connected to the physical network, the server including one or more processors; and a gaming machine configured to present a game, wherein the gaming machine is in communication with the server via the physical network, and wherein the game has a two-player mode in which two players each concurrently play individual, separate and distinct, primary games that enable activation of a head-to-head tournament game such that the individual, separate and distinct, primary games are played against each other, and wherein the game has a one-player mode in which one player plays one of the primary games that enables activation of the head-to-head tournament game, the gaming machine comprising:

a widescreen display for simultaneously presenting a first primary game of the individual, separate and distinct, primary games that is independent from a second primary game of the individual, separate and distinct, primary games, wherein the first primary game and the second primary game do not share reels, and a trigger event in the first or second primary game that initiates play of the head-to-head tournament game, wherein the first and second primary games are reconfigured to be played in the head-to-head tournament game, the two players swap corresponding primary games between each other before the initiation of the head-to-head tournament game, and wherein the tournament game is presented on the same widescreen display;

a first set of player input devices for the first primary game and a second set of player input devices for the second primary game;

a single player input device that allows a player to play the first and second primary games simultaneously;

two player card slots positioned on the cabinet, wherein two player card slots are in communication with a player tracking system; and one or more cashless gaming slots positioned within the cabinet of the gaming machine.

17. The gaming machine of claim 16, further comprising a touchscreen system coupled to the display.

18. A device-enabled gaming system comprising:

a physical network that connects and enables communication between components in the gaming device-enabled gaming system;

a server connected to the physical network, the server including one or more processors; and a plurality of networked gaming machines, wherein the plurality of networked gaming machines are in communication with the server via the physical network, and wherein the gaming system is configured to present a plurality of games, wherein the games have a two-player mode in which two players each concurrently play individual, separate and distinct, primary games that enable activation of a first head-to-head tournament game played against each other, and a one-player mode in which one player plays one of the primary games that enables activation of a second head-to-head tournament game played against the gaming machine, wherein each gaming machine of the plurality of networked gaming machines, simultaneously presents a first primary game of the individual, separate and distinct, primary games that is independent from a second primary game of the individual, separate and distinct, primary games on a main display, wherein the first primary game and the second primary game do not share reels, and a trigger event in either the first primary game or the second primary game initiates the first or second head-to-head tournament game on the same main display, wherein the two players swap corresponding primary games between each other before the initiation of the first or second head-to-head tournament game.

19. The gaming system of claim 18, further comprising a player tracking system in communication with the network server, wherein the player tracking system includes a database of player accounts.

20. The gaming system of claim 18, further comprising a tournament server for managing a tournament game to one or more gaming machines, wherein the tournament server is in communication with the plurality of networked gaming machines.

21. The gaming system of claim 18, wherein the tournament game is played on all active networked gaming machines.

22. A gaming system comprising:

a physical network that connects and enables communication between components in the gaming device-enabled gaming system;

a server connected to the physical network, the server including one or more processors;

a database of player accounts connected to the physical network; and a plurality of networked gaming machines, wherein the plurality of networked gaming machines are in communication with the networked server and the database through the processor, wherein the gaming system is configured to present a plurality of games, wherein the games have a two-player mode in which two players each concurrently play individual, separate and distinct, primary games that enable activation of a tournament game such that the individual, separate and distinct, primary games are played against each other, and wherein the games have a one-player mode in which one player concurrently plays both primary games that enable activation of the tournament game, wherein each gaming machine of the plurality of networked gaming machines, presents a first primary game of the individual, separate and distinct, primary games that is independent from a second primary game of the individual, separate and distinct, primary games, wherein the first primary game and the second primary game do not share reels, and a trigger event in either the first primary game or the second primary game initiates play of the tournament game on all active networked gaming machines, wherein the two players swap corresponding primary games between each other before the initiation of the tournament game, wherein the network server manages the tournament game; and a player tracking system in communication with the network server, wherein the player tracking system includes the database of player accounts.

23. The gaming machine of claim 1, wherein the first and second head-to-head tournament games are the same.

24. The gaming machine of claim 1, wherein the first and second head-to-head tournament games are different.

25. The gaming machine of claim 1, wherein the first set of player input devices is attached to a first movable interface.

26. The gaming machine of claim 25, wherein the second set of player input devices is attached to a second movable interface.

27. The gaming machine of claim 26, wherein the first and second movable interfaces are separately movable.

28. The gaming machine of claim 1, wherein a first game type corresponds to the first primary game and a second game type corresponds to the second primary game.

* * * * *

UNITED STATES PATENT AND TRADEMARK OFFICE

CERTIFICATE OF CORRECTION

PATENT NO. : 9,070,255 B2
APPLICATION NO. : 12/027097
DATED : June 30, 2015
INVENTOR(S) : Erik Christensen It is certified that error appears in the above-identified patent and that said Letters Patent is hereby corrected as shown below:

Specification

Column 5, Line 32, delete “a” after “both”

Column 6, Line 3, change “game” to --games--

Column 13, Line 41, delete “the” before “player”

Signed and Sealed this
Twenty-fourth Day of November, 2015

*Michelle K. Lee*

Michelle K. Lee
*Director of the United States Patent and Trademark Office*